W. DAME.
Improvement in Adjusting-Rolls for Loading Cars.
No. 132,449. Patented Oct. 22, 1872.
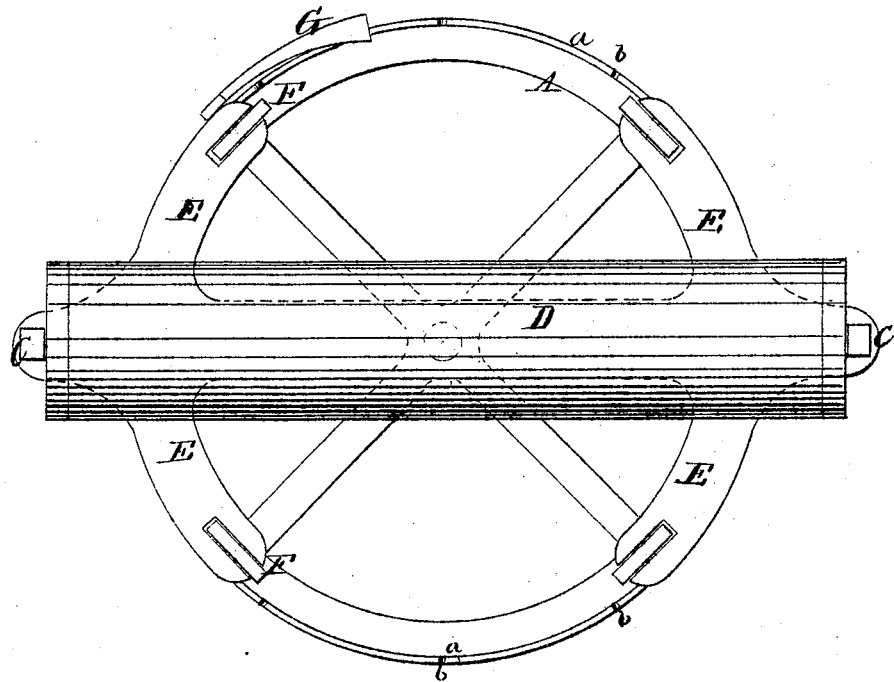
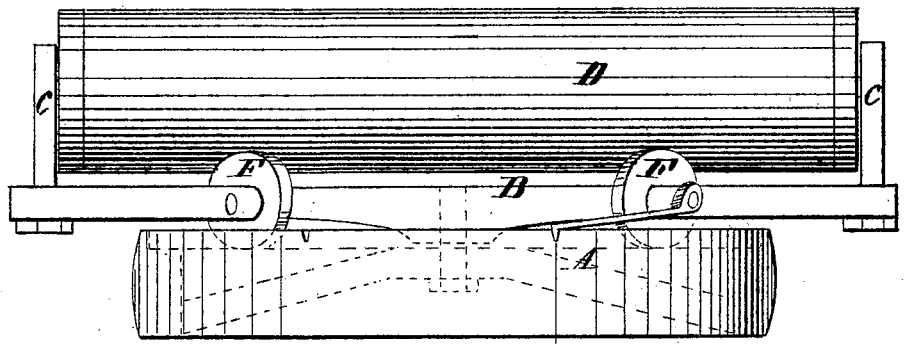
Witnesses
Phil C Masi
G. B. Steele
Inventor.
William Dame
Chipman Hosmer & Co
attys

UNITED STATES PATENT OFFICE.

WILLIAM DAME, OF WOONSOCKET, RHODE ISLAND.

IMPROVEMENT IN ADJUSTING-ROLLS FOR LOADING CARS.

Specification forming part of Letters Patent No. 132,449, dated October 22, 1872.

*To all whom it may concern:*

Be it known that I, WM. DAME, of Woonsocket, in the county of Providence and State of Rhode Island, have invented a new and valuable Improvement in Adjusting-Roll for Loading, &c.; and do hereby declare that the following is a full, clear, and exact description of the construction and operation of the same, reference being had to the annexed drawing making a part of this specification, and to the letters and figures of reference marked thereon.

Figure 1 of the drawing is a representation of a top view of my invention. Fig. 2 is a side view of my invention.

This invention has relation to the loading and unloading of lumber upon and from cars and wagons; and consists in the construction and novel arrangement of the parts of an apparatus provided with a horizontal roller over and upon which the lumber is moved, said roller being supported by a pivoted beam resting on a suitable base, and so arranged that through it the roller may be adjusted to facilitate the moving of boards in any desirable direction, all substantially as hereinafter more fully described.

Referring to the drawing, A designates a cylindrical base having its rim flanged at $a$ and notches $b$ formed therein. B is a beam pivoted at the center to said base, and holding at its ends standards C, which constitute the bearings for a large roller, D, which lies horizontally and is employed as a means for lightening the labor and facilitating the work of loading and unloading lumber, the same being moved over and upon or with the roller The ends of the beam project beyond and over the sides of the base, and are furnished each with two arms, E, slotted at the ends, and each arm provided with a roller, F, designed to roll over the surface of the base-rim inside the flange. These rollers support the beam against any weight placed upon it, and allow said beam, with the roller, to be turned to any desirable position in loading or unloading lumber, so as to allow the boards to be pushed straight in or out or obliquely. Pivoted to one of the arms E is a dog, G, which falls into the notches $b$ of the flange $a$ and serves to retain the beam and roller in whatever position they are adjusted. When the lumber has to be transported any considerable distance before being loaded the loading apparatus may be inverted and the roller used as a means for carrying the apparatus forward while the bottom is loaded with lumber.

What I claim as my invention, and desire to secure by Letters Patent, is—

1. The combination of the roller D, pivoted beam B, standard C, and base A, substantially as and for the purpose specified.

2. The beam B, dog G, notched flange $a$, base A, and loading-roller D, combined substantially as specified.

In testimony that I claim the above I have hereunto subscribed my name in the presence of two witnesses.

WILLIAM DAME.

Witnesses:
GEORGE A. WILBUR,
EDWARD PARKER.